US011531127B2

(12) United States Patent
Liu et al.

(10) Patent No.: US 11,531,127 B2
(45) Date of Patent: Dec. 20, 2022

(54) METHODS AND SYSTEMS FOR REFERENCE-BASED INVERSION OF SEISMIC IMAGE VOLUMES

(71) Applicant: ExxonMobil Upstream Research Company, Spring, TX (US)

(72) Inventors: Enru Liu, Sugar Land, TX (US); Matthew S. Casey, Houston, TX (US); John E. Mayhew, Spring, TX (US); Matthias Imhof, Katy, TX (US); J. Clayton Bell, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 438 days.

(21) Appl. No.: 16/393,515

(22) Filed: Apr. 24, 2019

(65) Prior Publication Data
US 2019/0331812 A1    Oct. 31, 2019

Related U.S. Application Data

(60) Provisional application No. 62/664,336, filed on Apr. 30, 2018.

(51) Int. Cl.
*G06G 7/48* (2006.01)
*G01V 1/28* (2006.01)
*G06T 15/08* (2011.01)
*G06T 17/05* (2011.01)

(52) U.S. Cl.
CPC .............. *G01V 1/282* (2013.01); *G06T 15/08* (2013.01); *G06T 17/05* (2013.01); *G01V 2210/663* (2013.01)

(58) Field of Classification Search
CPC .. G01V 1/282; G01V 2210/663; G01V 1/302; G01V 2210/614; G01V 2210/64; G01V 99/005; G06T 15/08; G06T 17/05
See application file for complete search history.

(56) References Cited

U.S. PATENT DOCUMENTS 6,480,790 B1 * 11/2002 Calvert ................. G01V 1/282
                                              702/14
2006/0056272 A1 * 3/2006 Hill ........................ G01V 1/282
                                              367/73

(Continued)

FOREIGN PATENT DOCUMENTS

WO    WO 2017/202637 A1    11/2017

OTHER PUBLICATIONS

Valentine, Andrew P., and Jeannot Trampert. "Data space reduction, quality assessment and searching of seismograms: autoencoder networks for waveform data." Geophysical Journal International 189.2 (2012): 1183-1202.*

(Continued)

*Primary Examiner* — Rehana Perveen
*Assistant Examiner* — Nithya J. Moll
(74) *Attorney, Agent, or Firm* — ExxonMobil Upstream Research Company—Law Department (57) ABSTRACT

Accordingly, there are disclosed herein geologic modeling methods and systems employing reference-based inversion of seismic image volumes. An illustrative method embodiment includes: (a) obtaining a measured seismic image volume; (b) determining a reference seismic image volume based on a reference model; (c) deriving a synthesized seismic image volume from a geologic model; (d) detecting at least one geologic model region where the synthesized seismic image volume and the measured seismic image volume are mismatched; (e) finding a reference model region where the reference seismic image volume best matches the measured seismic image volume; (f) replacing content of the at least one geologic model region with content of the reference model region to obtain an improved geologic model; and (g) outputting the improved geologic model.

14 Claims, 4 Drawing Sheets

(56) References Cited

U.S. PATENT DOCUMENTS

| | | | | |
|---|---|---|---|---|
| 2009/0119076 A1* | 5/2009 | Madatov | ............... | G01V 1/282 |
| | | | | 703/2 |
| 2009/0319243 A1* | 12/2009 | Suarez-Rivera | ........ | G06T 17/05 |
| | | | | 703/10 |
| 2011/0040536 A1* | 2/2011 | Levitan | ................... | G06F 30/20 |
| | | | | 703/2 |
| 2013/0054201 A1* | 2/2013 | Posamentier | ........ | G01V 99/005 |
| | | | | 703/2 |

OTHER PUBLICATIONS

U.S. Appl. No. 62/651,479, filed Apr. 2, 2018, Cheng et al.
Bawa, Condie, and Ganesan (2005) "LSH Forest: Self-Tuning Indexes for Similarity Search", International World Wide Web Conference Committee (IW3C2) *WWW* 2005, May 10-14, Chiba, Japan, ACM 1-59593-046-9/05/0005, pp. 651-660.
Hinton and Salakhutdinov (2006) "Reducing the Dimensionality of Data with Neural Networks", Science, Jul. 28, 2006, vol. 313, Issue 5786, pp. 504-507.
Yang, Lin, and Chen (2017) "Supervised Learning of Semantics-Preserving Hash via Deep Convolutional Neural Networks", IEEE Trans. on Pattern Analysis & Machine Intelligence, vol. 40, No. 2, arXiv:1507.00101v2 [cs.CV] Feb. 14, 2017, pp. 437-451.
Moyano, B. et al. (2010) "Quantitative calibration of rock-physics models", SEG Technical Program Expanded Abstracts 2010, Jan. 1, 2010, pp. 2496-2500 (XP55393149).

\* cited by examiner

*FIG. 6B*

METHODS AND SYSTEMS FOR REFERENCE-BASED INVERSION OF SEISMIC IMAGE VOLUMES

CROSS-REFERENCE TO RELATED APPLICATIONS

This application claims the benefit of U.S. Provisional Application No. 62/664,336 that was filed on Apr. 30, 2018, the disclosure of which is incorporated herein by reference.

TECHNICAL FIELD

The present application relates generally to the field of hydrocarbon exploration, development, and production, and more particularly to subsurface structure mapping and modeling. Specifically, the disclosure relates to methods and systems for geologic modeling that employ reference models to improve the fit of subsurface models to seismic measurements.

BACKGROUND

A geologic model is a computer-based three-dimensional ("3D") representation of a region beneath the earth's surface. Such models can be used to model a petroleum reservoir, a depositional basin, or other regions which may have valuable mineral resources. Once the model is constructed, it can be used for various purposes, many of which are intended to facilitate efficient and economical recovery of the valuable resources. For example, the geologic model may be used in various hydrocarbon exploration, development, and production operations. For example, the geologic model may be used as an input to petroleum reservoir simulations, which are used to plan well placements and predict hydrocarbon production from a petroleum reservoir over time.

Geologic models must often be derived from seismic survey measurements, aided by reference to well logs. However, the relationships between field recorded seismic data and the underlying subsurface architecture are complex and ambiguous. These complexities create difficulties when one seeks to create an accurate geologic model using realistic geometries, features, and architecture. Modelers typically employ an adaptive fitting approach when trying to generate a representative geologic model, yet the adaptive fitting solutions often converge to a local (suboptimal) error minimum that fails to address the relationship complexities in a geologically meaningful way. The modelers may attempt to quantify solution uncertainty by repeating the adaptation fitting process in multiple ways from multiple starting points and analyzing the range of solutions, yet the presence of unrealistic solutions may hinder the analysis. Therefore, alternatives to the adaptive fitting approach are sought to improve the consistency of models with known principles of geologic processes.

SUMMARY

Accordingly, there are disclosed herein geologic modeling methods and systems employing reference-based inversion of seismic image volumes. An illustrative method embodiment includes: (a) obtaining a measured seismic image volume; (b) determining a reference seismic image volume based on a reference model; (c) deriving a synthesized seismic image volume from a geologic model; (d) detecting at least one geologic model region where the synthesized seismic image volume and the measured seismic image volume are mismatched; (e) finding a reference model region where the reference seismic image volume best matches the measured seismic image volume; (f) replacing content of the at least one geologic model region with content of the reference model region to obtain an improved geologic model; and (g) outputting the improved geologic model.

One illustrative geologic modeling system embodiment includes: a memory having geologic modeling software; and one or more processors coupled to the memory to execute the geologic modeling software. The software causes one or more processors to implement the foregoing method.

The software can also be illustratively embodied as a computer readable program in a non-transitory information storage product, to implement the foregoing system and method embodiments when suitably executed.

Each of the foregoing embodiments may be employed individually or conjointly, and they may further employ one or more of the following optional features in any suitable combination. For example, the foregoing embodiments may further comprise constructing the reference model by systematically varying internal structure of regions in the model or constructing the reference model by simulating geologic processes. As another example, the foregoing embodiments may further comprise using a geologic model for a similar region as the reference model. As yet another example, the foregoing embodiments may further comprise creating a locality sensitive hashing (LSH) database using windowed regions of the synthetic seismic image volume. In such embodiments, the detecting may include comparing windowed regions of the synthesized seismic image volume with windowed regions of the measured seismic image volume and the finding may include: (i) calculating a target LSH value from a windowed region of the measured seismic image volume; and (ii) performing a Hamming-distance, Euclidean-distance, or other similarity metric based approximate nearest-neighbor search of the database. As a further example, the foregoing embodiments may further comprise creating an auto-encoding using windowed regions of the synthetic seismic image volume. Additionally, the foregoing embodiments may further comprise before said outputting: (i) deriving an improved seismic image volume from the improved geologic model; and (ii) verifying that the improved seismic image volume matches the measured seismic image volume. Further, in one or more of the foregoing embodiments, the outputting may include storing the improved geologic model on a non-transitory information storage device and/or displaying a visual representation of the improved geologic model. Finally, the foregoing embodiments may additional include using the improved geologic model to evaluate one or more well placement and production strategies.

It should be understood that the drawings and corresponding detailed description do not limit the disclosure, but on the contrary, they provide the foundation for understanding all modifications, equivalents, and alternatives falling within the scope of the appended claims.

NOMENCLATURE

Various terms as used herein are defined below. To the extent a term used in a claim is not defined below, it should be given the broadest possible definition persons in the pertinent art have given that term as reflected in at least one printed publication or issued patent.

As used herein, the term "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of data to identify preferred development approaches and methods. Accordingly, hydrocarbon development may include modeling of subsurface formations and extraction planning for periods of production, determining and planning equipment to be utilized and techniques to be utilized in extracting hydrocarbons from the subsurface formation, and the like.

As used herein, the term "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration may include acquiring measurement data, modeling of the measurement data to form subsurface models, and determining likely locations for hydrocarbon reservoirs within the subsurface. The measurement data may include seismic data, gravity data, magnetic data, electromagnetic data, and the like.

As used herein, the term "hydrocarbon operations" refers to any activity associated with hydrocarbon exploration, hydrocarbon development, and/or hydrocarbon production. For example, hydrocarbon operations may comprise hydrocarbon management or managing hydrocarbons, which may include hydrocarbon extraction, hydrocarbon production, hydrocarbon exploration, identifying potential hydrocarbon resources, identifying potential well locations (such as injection and/or production wells), determining well injection and/or extraction rates, identifying reservoir connectivity, acquiring hydrocarbon resources, disposing of and/or abandoning hydrocarbon resources, reviewing prior hydrocarbon management decisions, and any other hydrocarbon related acts or activities.

As used herein, the terms "hydrocarbon production" or "producing hydrocarbons" refer to any activity associated with extracting hydrocarbons from a subsurface location through a well or other opening. Hydrocarbon production normally refers to any activity conducted to form the wellbore along with any activity in or on the well after the well is completed. Accordingly, hydrocarbon production includes not only primary hydrocarbon extraction, but also secondary and tertiary production techniques, such as injection of gas or liquid for increasing drive pressure or mobilizing the hydrocarbons; treating the well by, for example, chemicals or hydraulic fracturing the wellbore to promote increased flow; well servicing; well logging; and other well and wellbore treatments.

DETAILED DESCRIPTION

Various specific embodiments, versions, and examples of the invention will now be described, including preferred embodiments for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

Figure 1:
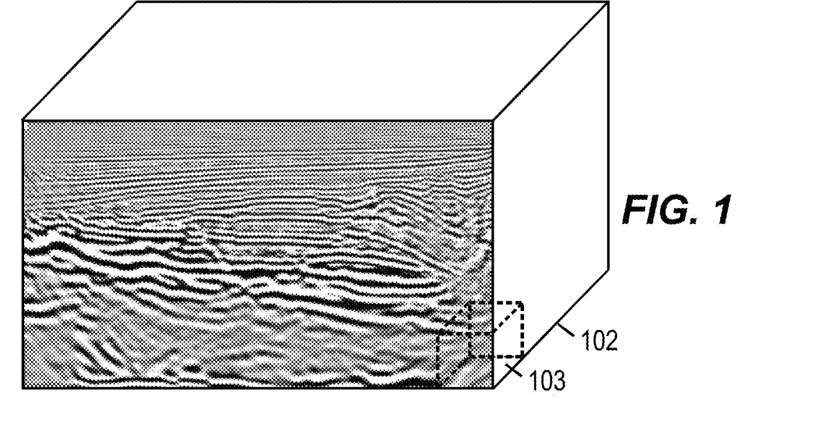
FIG. 1 shows an illustrative measured seismic image volume.

Turning now to the figures, FIG. 1 shows an illustrative measured seismic image volume 102, which can be expressed in many ways but is here shown as a three-dimensional image. The measured image volume 102 is typically obtained by processing of field-recorded seismic survey traces representing seismic wave measurements in response to shots or other sources of seismic energy triggered at an array of shot locations. The processing corrects for seismic wave travel times to determine reflective interface locations, and combines repeated measurements at each location to increase the signal to noise ratio. While seismic reflectivity is commonly employed, other seismic wave properties can also or alternatively be derived from the traces and used to construct the measured seismic image volume. One particular transformation is the inversion of the seismic data to petrophysical parameters such as porosity, clay volume fraction, etc. that are often part the geological model.

As discussed further below, the geologic modeling system creates an initial geologic model, which in some embodiments is empty and devoid of any internal structures. Alternatively, the initial geologic model 204 (FIG. 2) may be based at least in part on the measured seismic image volume. Other sources of model information may include well logs, experience with similar subsurface environments elsewhere, and well-known principles of geologic processes. In particular, the (localized) information available from well logs may be employed to guide and constrain the geologic model in the proximity of the well locations.

Figure 2:
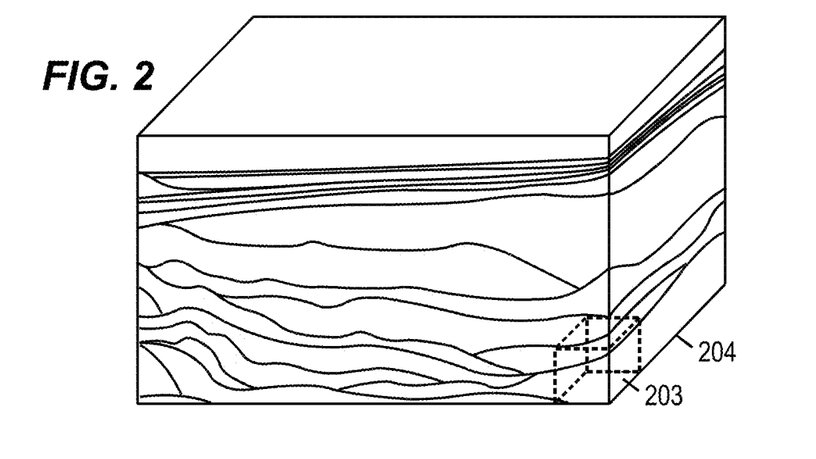
FIG. 2 shows an illustrative geologic model derived from seismic measurements.

As spatially correlated amplitudes or reflectivity values generally indicate the presence of formation or lithological boundaries, a modeler may interpret the measured seismic image volume to identify horizons (i.e., interfaces between formation layers) and other subsurface structures on this basis, or the modeling system may employ algorithmic techniques to automatically extract such information from the measured seismic image volume. The geologic model 204 can also be expressed in a variety of ways, including the use of tessellated surfaces and polyhedral meshes which generally permit more compact representations than regular volumetric grids.

Figure 3:
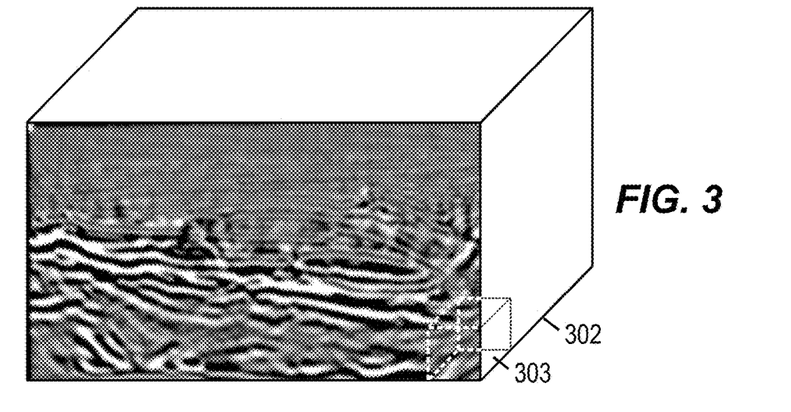
FIG. 3 shows an illustrative synthetic seismic image volume.

Regardless of the form of expression, the geologic model 204 may be "populated", i.e., elasticity and/or other petrophysical properties values may be specified for each spatial location within the model. The population process may rely on well logs, extrapolations from neighboring regions, experience with similar environments elsewhere, known principles of geologic processes may be used, and a fair degree of guesswork. Given a populated model, the modeling system can perform simulated seismic measurements or otherwise generate a synthetic seismic image volume 302 (FIG. 3) for the geologic model 204. The modeling system compares the synthetic seismic image volume 302 to the measured seismic image volume 102 to identify any regions where the mismatch exceeds a predetermined threshold. Any of various known mismatch measurements can be used, though a windowed mean square error measurement may be preferred. Other suitable mismatch measurements may include Manhattan distance, correlation, similarity, and structure-similarity distance. Each of these measurements can be determined in the physical space domain or in a transform domain such as, e.g., a discrete wavelet domain or the Fourier Transform domain.

For example, windowed region 303 (FIG. 3) may be differenced from windowed region 103 (FIG. 1), and the mean square of the difference calculated and compared to the threshold. The regions where the mismatch exceeds the threshold may thus be considered to have a fixed region size equal to the size of the window. The various window positions used for the mismatch calculation are permitted to overlap in accordance with standard filtering practice; however, the regions used for the subsequent steps may (or may not) be required to be non-overlapping regions.

Based on the mismatch calculation, the disclosed geologic modeling systems select regions (e.g., region 203 of FIG. 2) for modification. The modification process involves replacing the existing structure within that or another overlapping region of the geologic model with the structure of a selected region within a reference model 404. In a preferred embodiment, this replacement region is a line segment mimicking a well path and the process of replacement mimics the accommodation of information from a newly drilled well. The elongated replacement region may be thought of as a pseudo-well.

Figure 4A:
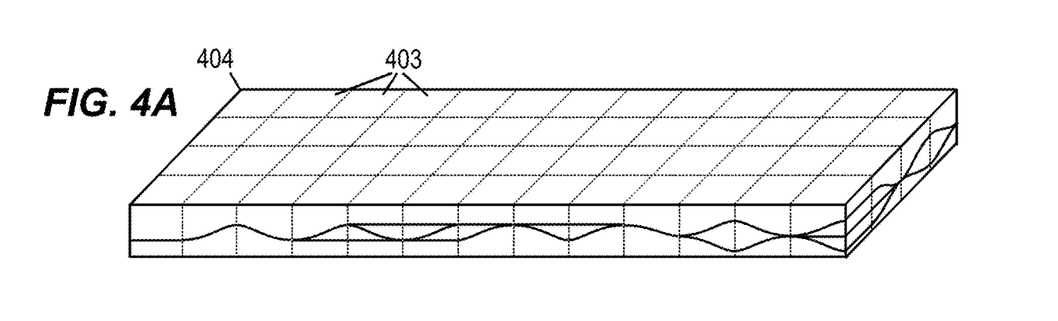
FIG. 4A shows an illustrative geologic reference model.

FIG. 4A shows an illustrative reference model 404 constructed as an array of regions 403, each having systematically varied internal structures. (Divisions used during the construction process are shown for illustration, but are not actually present in the reference model 404. Thus, a selected region may have any position within the volume and does not need to align with any of the divisions used for constructing the reference model.) As another example, the reference model may be a previously-derived geologic model from a similar environment, or a combination of multiple such models. As a further example, the reference model may be obtained by simulating geologic processes relevant to the region of interest, making the reference model (and the derived geologic model) consistent with the chosen depositional concept(s). Any suitable construction method may be employed, so long as the resulting model contains the full range of expected structural possibilities for the region of interest. The reference model may be of any size, form, or shape. Basically, the reference model will be mined for regions that may be used as additional conditioning data (e.g., pseudo-wells) for the progressive fitting of the geologic model 204.

Figure 4B:
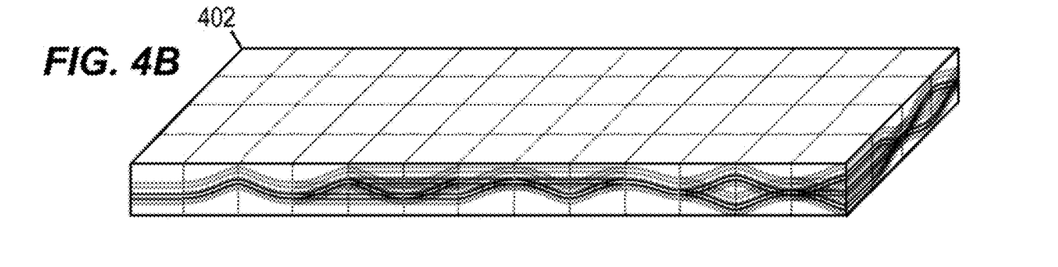
FIG. 4B shows an illustrative reference seismic image volume.

As with geologic model 204, the reference model 404 is populated so that the geologic modeling system can perform simulated seismic measurements or otherwise synthesize a reference seismic image volume 402 (FIG. 4B). Where there is a range of suitable petrophysical properties, the property values may be systematically varied throughout the range, with reference seismic image data being synthesized for each variation.

To select a replacement region (e.g., a pseudo-well) from the reference model when the mismatch exceeds a predetermined threshold, the geologic modeling system searches the reference seismic image volume 402 for the windowed region that best matches the windowed region 103 of the measured seismic image volume 102. The best matching windowed region corresponds to the selected region of the reference model, and the structure from that selected region is used to replace the structure within the corresponding region of the geologic model 204. In at least some embodiments, indices (such as position coordinates) may be used to identify the selected region in the reference model, and indeed, the geologic model may be expressed as an array of indices that indicate, for each position within the geologic model, the best-matching region from the reference model. The resulting geologic model then represents an assembly of regions from the reference model thereby providing a model consistent with the principles employed for constructing the reference model. In some embodiments, the process of replacing or incorporating structure from the reference model regions may employ an affine transformation (i.e., rotation, scaling and translation of the replacement structure) and/or smoothing to further reduce any mismatch and/or better integrate the replacement structures seamlessly into the geologic model.

Figure 5:
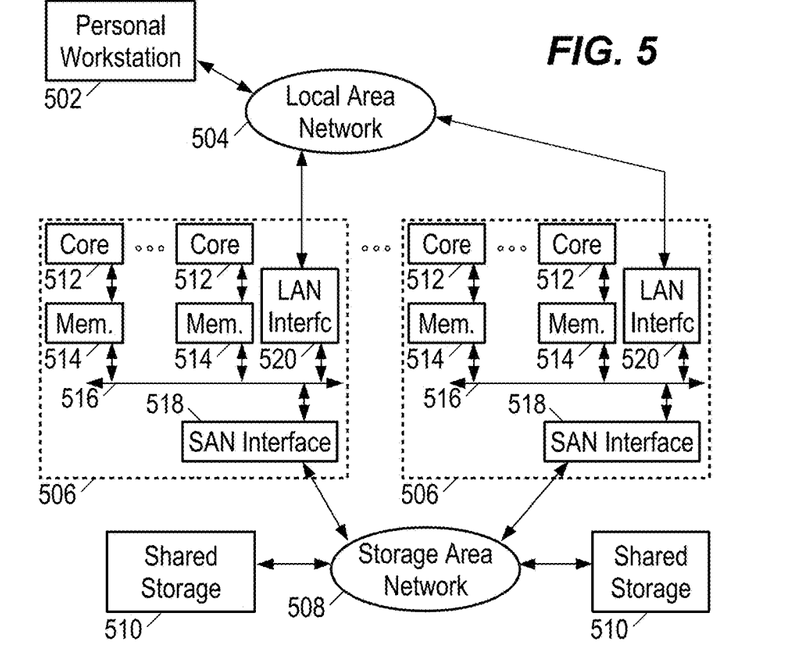
FIG. 5 is a block diagram of an illustrative geologic modeling system.

To flesh out the details of the foregoing techniques, we now turn to FIG. 5, which is a block diagram of an illustrative geologic modeling system. The illustrative geologic modeling system includes a personal workstation 502 coupled via a local area network (LAN) 504 to one or more multi-processor computers 506, which are in turn coupled via a storage area network (SAN) 508 to one or more shared storage units 510. Personal workstation 502 serves as a user interface to the model conditioning system, enabling a user to load data into the system, to configure and monitor the operation of the system, and to retrieve the results (often in the form of image data) from the system. Personal workstation 502 may take the form of a desktop computer with a display that graphically shows representations of the input and result data, and with a keyboard that enables the user to move files and execute processing software. LAN 504 provides high-speed communication between multi-processor computers 506 and with personal workstation 502. The LAN 504 may take the form of an Ethernet network.

Multi-processor computer(s) 506 provide parallel processing capability to enable suitably prompt processing of the input data to derive the results data. Each computer 506 includes multiple processors 512, distributed memory 514, an internal bus 516, a SAN interface 518, and a LAN interface 520. Each processor 512 operates on allocated tasks to solve a portion of the overall problem and contribute to at least a portion of the overall results. Associated with each processor 512 is a distributed memory module 514 that stores application software and a working data set for the processors' use. Internal bus 516 provides inter-processor communication and communication to the SAN or LAN networks via the corresponding interfaces 518, 520. Communication between processors in different computers 506 can be provided by LAN 504.

SAN 508 provides high-speed access to shared storage devices 510. The SAN 508 may take the form of, e.g., a Fibrechannel or Infiniband network. Shared storage units 510 may be large, stand-alone information storage units that employ magnetic disk media for nonvolatile data storage. To improve data access speed and reliability, the shared storage units 510 may be configured as a redundant disk array ("RAID").

The processors 512 cooperatively execute geologic modeling software stored in the distributed memory and/or on the shared storage units, which configures to processors to retrieve measurement data and stored model information from the shared storage units 510, operate on the retrieved data and information to implement the modeling methods and improvements disclosed herein, and to store the resulting geologic models on the shared storage units 510 for future use. Such future use includes visualization methods to convey model information to users, simulation of reservoir fluid movements, and evaluation of well placement and production strategies, enabling users to select sites for drillers to direct boreholes, complete wells, and produce reservoir fluids in an efficient manner.

Figure 6A:
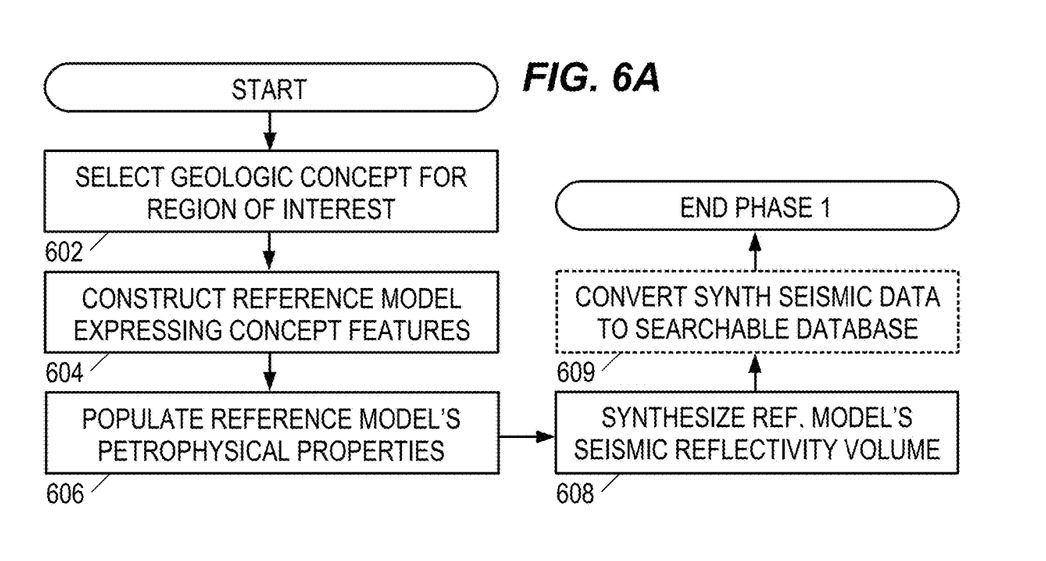
FIG. 6A is a flow diagram of an illustrative geologic modeling method's first phase.
Figure 6B:
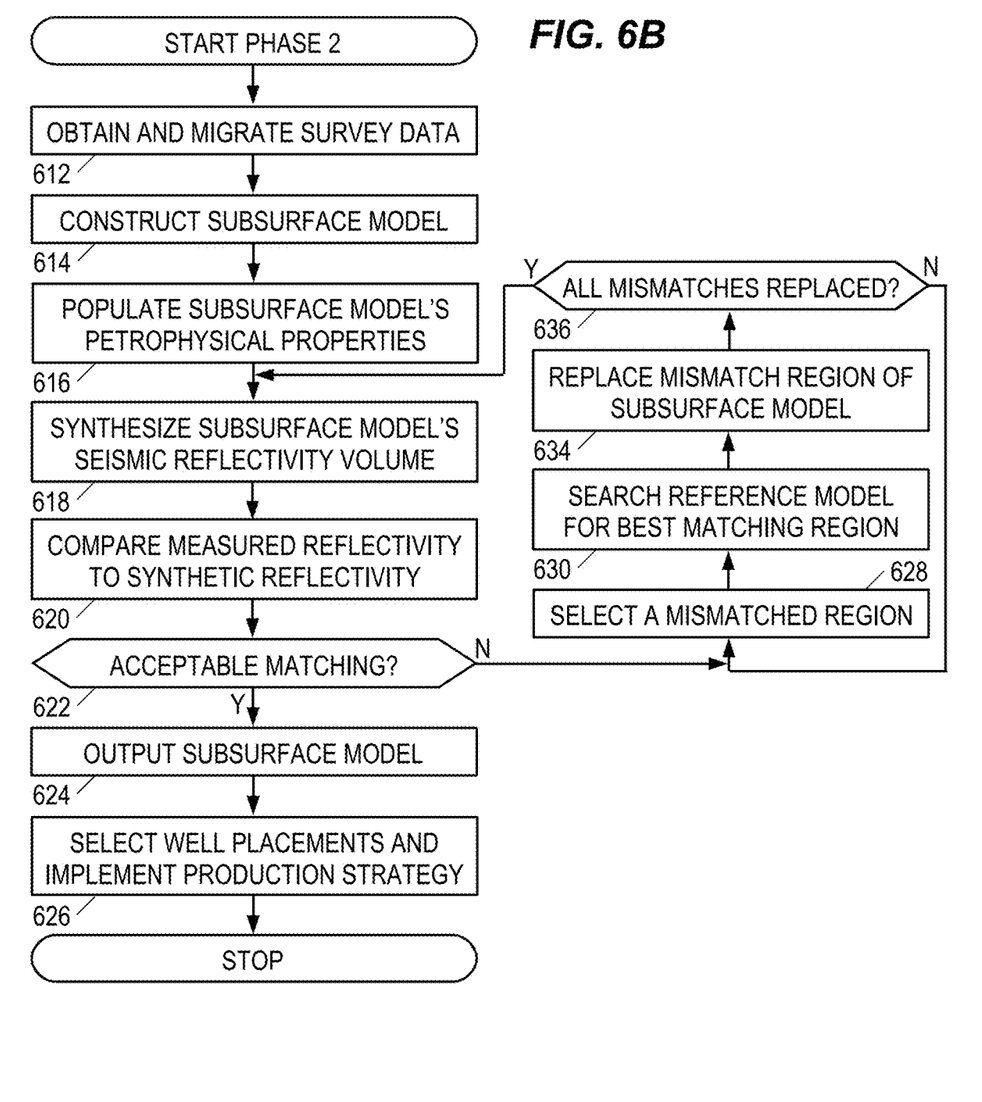
FIG. 6B is a flow diagram of an illustrative geologic modeling method's second phase.

FIGS. 6A and 6B provide a flow diagram of an illustrative geologic modeling method, divided into two phases to simplify the drawings. The first phase includes blocks 602 to 608 and optionally 609, shown in FIG. 6A, and the second phase includes blocks 612 to 636 shown in FIG. 6B. The first phase yields the reference model, and the second phase yields the geologic model.

In block 602, one or more geologic concepts are selected for the subsurface region of interest. Illustrative concepts may include sedimentary layering, parasequences, and channel-lobe deposition in a deltaic, shallow water, and/or deep water environment. The appropriate parameters for the selected geologic concept(s) are provided to the modeling system, which in block 604 obtains or constructs a reference model that preferably expresses the full range of expected features for the selected concept(s). In block 606, the modeling system populates the reference models' petrophysical properties (or at least those properties relevant to seismic measurements, e.g., acoustic impedance and sound velocity). In block 608, the modeling system generates a synthetic seismic image volume for the reference model. The seismic measurement is preferably reflectivity, but other suitable measurements may additionally or alternatively be used. One alternative may be resampling petrophysical parameters such as porosity or clay volume fraction to the seismic scale or bandwidth.

Optionally, in block 609, the modeling system operates to improve the searchability of the synthetic seismic image volume. In at least some embodiments, the modeling system performs indexing to enable image-content-based retrieval, e.g., by performing dimensionality reduction followed by regression. Thus, in one or more implementations the system processes the synthetic image data from each window position within the synthetic seismic image volume using a locality sensitive hashing (LSH) technique, which maps similar content to similar binary codes. Other suitable (non-linear) dimensionality-reduction techniques include Sammon's mapping, self-organizing maps (SOM), principal curves and manifolds, autoencoders, Gaussian process latent variable models, curvilinear component analysis, curvilinear distance analysis, diffeomorphic dimensionality reduction, kernel principal component analysis (KPCA), isomap, locally-linear embedding, Laplacian eigenmaps, manifold alignment, diffusion maps, Hessian locally-linear embedding (Hessian LLE), modified locally-linear embedding (MLLE), relational perspective map, local tangent space alignment, local multidimensional scaling, maximum variance unfolding, nonlinear PCA, data-driven high-dimensional scaling, manifold sculpting, i-distributed stochastic neighbor embedding, RankVisu, and topologically constrained isometric embedding. In one or more implementations an auto-encoding method may also be used to process the synthetic image data from each window position within the synthetic seismic image volume.

For example, one or more embodiments may employ an LSH technique that combines dimensionality reduction with regression. Various suitable regression methods exist for use with LSH or the other identified dimensionality reduction techniques, including neural networks, support vector machines, k-nearest neighbors, boosting, decision trees and random forests, or learning vector quantization.

The LSH hash codes (or other reduced-dimensionality representations) may be stored in a database that references the corresponding window positions in the synthetic seismic image volume (and thus the corresponding region position(s) in the reference model). LSH techniques enable an approximate nearest-neighbor search to be performed using Hamming distance calculations that are quick and efficient, so that the hash code closest to the hash code of the mismatched seismic measurement image can be identified and accessed to identify the corresponding window position(s) in the synthetic seismic image volume, which in turn can be thoroughly evaluated to complete the identification of best-matched region position. Further detail on suitable LSH techniques can be found in Bawa, Condie, and Ganesan, "LSH Forest: Self-Tuning Indexes for Similarity Search", International WWW Conf. Comm (IW3C2) WWW 2005, May 10-14, Chiba, Japan, ACM 1-59593-046-9/05/0005; and Yang, Lin, and Chen, "Supervised Learning of Semantics-Preserving Hash via Deep Convolutional Neural Networks", IEEE Trans. on Pattern Analysis & Machine Intelligence, arXiv:1507.00101v2 [cs.CV] 14 Feb. 2017; both of which are hereby incorporated herein by reference in their entireties. Conventional search techniques can be employed for use with other reduced-dimensionality representations.

As another example, one or more embodiments may utilize an auto-encoding technique to reduce the data dimensionality. For example, a neural network may be used to create an auto-encoding using the windowed regions of the synthetic seismic image volume. The auto-encoding may be used to reduce the dimensionality of synthesized seismic image volume to identify one or more features in the synthesized seismic image volume e.g., the neural network may be trained to ignore signal "noise" in the synthesized seismic image volume). Corresponding features may then be identified in the reference model, and these features may be used to identify the reference model region where the reference seismic image volume best matches the measured seismic image volume. An example of an illustrative auto-encoding technique is described in Hinton et al., "Reducing the Dimensionality of Data with Neural Networks", *Science*, Vol. 313, pp. 504-507 (2006).

FIG. 6B shows the second phase of the method, which begins in block 612 with obtaining seismic survey data. If the seismic survey data is not already in the form of a seismic image volume 102, the system may process the seismic survey traces to derive the measured seismic image volume. In block 614, the system constructs a geologic model 204. In some implementations, the initial geologic model is "empty", i.e., a homogeneous, unstratified medium. In other implementations, the model may include interpreted layers and interfaces, or may be derived with traditional inversion techniques. Alternatively, if well logs are available and the geologic concept is believed to involve channels or lobes, the geologic model may be generated using object based conditioning techniques, e.g., the techniques described in U.S. Provisional Application No. 62/651,479, filed Apr. 2, 2018 and titled "Conditioning Method and System for Channel Lobe Deposition Environment" which is incorporated herein by reference. In block 616, the geologic modeling system populates the geologic model, associating seismic wave velocities and acoustic impedances with each body or layer of the geologic model. In block 618, the system simulates the seismic measurement process or otherwise generates the synthetic seismic image volume from the populated geologic model.

In block 620, the system compares the measured seismic image volume and synthetic seismic image volume and detects any windowed regions where the mismatch exceeds a given threshold. In block 622, the system determines whether any such windowed regions have been detected, and if not (i.e., if the synthetic and measured seismic image volumes match), therein in block 624 the system accepts the current geologic model as an adequate model of the region of interest and stores the model in a nonvolatile information storage medium for later display and/or usage. In block 626, the system may provide an interactive display of the model to a user, enabling the user to select well placements and specify production strategies. Alternatively, the system may employ a range of strategies for automatic well placement and production, evaluating each in turn to select an optimal placement and production strategy. The strategies may then be communicated to the teams in the field for their use in drilling and production of the reservoir.

If, in block 622, there are one or more windowed regions where the mismatch exceeds the threshold, the system performs a loop (blocks 628 to 636) to iterate through each of the mismatch regions. The system selects a first of the mismatch regions in block 628, taking the measured seismic image data for that selected region as a target. In block 630, the system searches the reference seismic image volume to find the seismic image that best matches the target. As discussed previously, the system may employ an LSH technique to facilitate the search process.

Once the best-matching region of the reference seismic image volume is found, the system in block 634 replaces the structure (interfaces and geobodies) of the corresponding region of the geologic model with the structure of the best matching region in the reference model. The best-matching region's structure may be copied into the geologic model, potentially employing a smoothing or blending operation to prevent discontinuities along the boundary of the region. Preferably, a vertically elongated region or a line segment from the reference model is introduced into the geologic model as a pseudo-well which mimics the addition of data obtained by drilling and logging a new well that intersects the location of highest misfit.

In block 636, the system checks to determine whether all of the mismatched windowed regions have been replaced, and if not, the loop (blocks 628 to 636) is repeated. Otherwise, the system returns to block 618 to recalculate the synthetic seismic image volume. The comparison, search, and replacement process may be repeated until a satisfactory match is achieved throughout the synthetic seismic image volume.

In an exemplary application, the geologic model will be constructed based on well logs and seismic data. Seismic data has high spatial coverage, but low resolution compared to the desired geologic model. Well logs have resolution comparable to the geologic model, but cover only the well tracks. The geologic model can be constructed using any of the well-known methods that allow conditioning to well logs. Such methods include geostatistics, multi-point statistics (MPS), object-based modeling or functional form modeling. One suitable conditioning workflow is described in U.S. Provisional Application No. 62/651,479 ("Conditioning Method and System for Channel Lobe Deposition Environment"), enabling conditioning of the model to data from actual and pseudo wells.

Thus, a first model (block 614) is built that honors the actual well data. Using a petrophysical model, i.e. a rock physics model that link petrophysical properties (porosity, clay volumes, saturations, pressures etc.), to elastic properties (compressional and shear wave velocities and density), the geological model is populated with properties including seismic impedance seismic, i.e., the product of seismic velocity and density. As an example, the petrophysical model may be based on the empirical Castagna equation that relates porosity and clay volume fraction to seismic velocity. Further, density may be computed from seismic velocity using the empirical Gardner equations. Parameters for the empirical relations are estimated from the well logs. Synthetic seismic data are computed using the computational model with a wavelet estimated from the seismic data. Actual and synthetic seismic data are compared based on similarity between the discrete wavelet transforms (DWT) of collocated three-dimensional data windows. The location with the largest misfit between actual and synthetic data is recorded. Using the LSH algorithm for the actual seismic trace with the highest misfit, a vertical column of properties is retrieved from the reference model by indexing the actual seismic trace into the synthetic reference traces. This vertical property column is treated like the well logs of a pseudo well traversing through the recorded misfit location; and this pseudo well is added to the list of wells. This process is repeated until the highest misfit is below the specified threshold.

The reference model 404 is built by functional-form modeling of the expected concepts in numerous shapes, scales, and spatial configurations; and with a range of petrophysical transformations. Synthetic seismic data are again computed by convolution of the resulting reflectivity with a seismic wavelet estimated from seismic data.

The method can be seen as progressively drilling pseudo wells through locations of high misfit and adding them to the conditioning process.

Instead of converting the geologic models to synthetic seismic data for comparison with the actual seismic data, an alternative implementation converts the actual seismic data to "actual" petrophysical properties for comparison with the geologic models. Conversion of seismic data to petrophysical data is an inversion process and its result is limited by assumptions, seismic bandwidth and noise. The inversion is preferably conditioned with the existing well data. The resulting petrophysical data may include impedance, density, porosity, or clay volume fraction. This inversion may be viewed as part of the seismic data processing workflow. Due to the resolution differences between seismic data and geologic models, the parameters of the geologic models may be resampled to the resolution of the seismic data. In this embodiment, steps 608 and 618 are replaced by resampling the model to seismic resolution and may be performed by band-pass filtering the petrophysical parameters of the geologic models to the seismic bandwidth.

Though the operations shown and described in the flow diagrams are treated as being sequential for explanatory purposes, in practice the method may be carried out by multiple processors operating concurrently and perhaps even speculatively to enable out-of-order operations. The ordering and sequential treatment is not meant to be limiting. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A geologic modeling method that comprises:
obtaining a measured seismic image volume for a subsurface region of interest;
determining a reference seismic image volume based on a reference model, wherein the reference model comprises a geologic model for another subsurface region that is similar to the subsurface region of interest;
deriving a synthesized seismic image volume from a geologic model for the subsurface region of interest;
creating a locality sensitive hashing (LSH) database using windowed regions of the synthesized seismic image volume;
detecting at least one geologic model region within the geologic model for the subsurface region of interest where the synthesized seismic image volume and the measured seismic image volume are mismatched by comparing the windowed regions of the synthesized seismic image volume with windowed regions of the measured seismic image volume;
finding a reference model region within the reference model where the reference seismic image volume best matches the measured seismic image volume by calculating a target LSH value from a windowed region of the measured seismic image volume and performing an approximate nearest-neighbor search of the LSH database;
replacing content of the at least one geologic model region within the geologic model for the subsurface region of interest with content of the reference model region from the reference model to obtain an improved geologic model for the subsurface region of interest; and
outputting the improved geologic model.

2. The method of claim 1, further comprising:
constructing the reference model by systematically varying internal structure of regions in the reference model.

3. The method of claim 1, further comprising:
creating an auto-encoding using windowed regions of the synthesized seismic image volume.

4. The method of claim 1, further comprising, before said outputting:
deriving an improved seismic image volume from the improved geologic model; and
verifying that the improved seismic image volume matches the measured seismic image volume.

5. The method of claim 1, wherein the said outputting includes:
storing the improved geologic model on a non-transitory information storage device; and
displaying a visual representation of the improved geologic model.

6. The method of claim 1, further comprising: using the improved geologic model to evaluate one or more well placement and production strategies.

7. The method of claim 1, further comprising using the improved geologic model to determine where to drill one or more wells and causing one or more wells to be drilled.

8. A geologic modeling system that comprises:
a memory having geologic modeling software; and
one or more processors coupled to the memory to execute the geologic modeling software, the software causing the one or more processors to perform operations including:
obtaining a measured seismic image volume for a subsurface region of interest;
determining a reference seismic image volume based on a reference model, wherein the reference model comprises a geologic model for another subsurface region that is similar to the subsurface region of interest;
deriving a synthesized seismic image volume from a geologic model for the subsurface region of interest;
creating a locality sensitive hashing (LSH) database using windowed regions of the synthesized seismic image volume;
detecting at least one geologic model region within the geologic model for the subsurface region of interest where the synthesized seismic image volume and the measured seismic image volume are mismatched by comparing the windowed regions of the synthesized seismic image volume with windowed regions of the measured seismic image volume;
finding a reference model region within the reference model where the reference seismic image volume best matches the measured seismic image volume by calculating a target LSH value from a windowed region of the measured seismic image volume and performing an approximate nearest-neighbor search of the LSH database;
replacing content of the at least one geologic model region within the geologic model for the subsurface region of interest with content of the reference model region from the reference model to obtain an improved geologic model for the subsurface region of interest; and
storing the improved geologic model on a non-transitory information storage device.

9. The system of claim 8, wherein the operations further include:
using the improved geologic model to evaluate one or more well placement and production strategies.

10. The system of claim 8, further comprising:
creating an auto-encoding using windowed regions of the synthesized seismic image volume.

11. The system of claim 8, wherein the operations further include, before said outputting:
deriving an improved seismic image volume from the improved geologic model; and
verifying that the improved seismic image volume matches the measured seismic image volume.

12. A non-transitory information storage product having computer readable program code embodied therein, which when executed implements a geological modeling method that comprises:
obtaining a measured seismic image volume for a subsurface region of interest;
determining a reference seismic image volume based on a reference model, wherein the reference model comprises a geologic model for another subsurface region that is similar to the subsurface region of interest;
deriving a synthesized seismic image volume from a geologic model for the subsurface region of interest;
creating a locality sensitive hashing (LSH) database using windowed regions of the synthesized seismic image volume;
detecting at least one geologic model region within the geologic model for the subsurface region of interest where the synthesized seismic image volume and the measured seismic image volume are mismatched by comparing the windowed regions of the synthesized seismic image volume with windowed regions of the measured seismic image volume;

finding a reference model region within the reference model where the reference seismic image volume best matches the measured seismic image volume by calculating a target LSH value from a windowed region of the measured seismic image volume and performing an approximate nearest-neighbor search of the LSH database;

replacing content of the at least one geologic model region within the geologic model for the subsurface region of interest with content of the reference model region from the reference model to obtain an improved geologic model for the subsurface region of interest; and outputting the improved geologic model.

13. The product of claim 12, wherein said outputting includes:

storing the improved geologic model on a non-transitory information storage device; and displaying a visual representation of the improved geologic model.

14. The product of claim 12, further comprising:

using the improved geologic model to evaluate one or more well placement and production strategies.

\* \* \* \* \*